(12) United States Patent
Hollemann et al.

(10) Patent No.: US 7,573,930 B2
(45) Date of Patent: Aug. 11, 2009

(54) ANAMORPHOTIC SOLID-SATE LASER

(75) Inventors: Günter Hollemann, Jena (DE); Peter Heist, Jena (DE); Peter Oesterlin, Göttingen (DE); Berthold Burghardt, Waake (DE); Hans-Jürgen Kahlert, Gottingen (DE); Klaus Brunwinkel, Göttingen (DE); Henning Schmidt, Göttingen (DE); Thomas Gabler, Kromsdorf (DE); Ulf Krause, Jena (DE)

(73) Assignee: Innovavent GmbH, Gottingen (DE)

( * ) Notice: Subject to any disclaimer, the term of this patent is extended or adjusted under 35 U.S.C. 154(b) by 0 days.

(21) Appl. No.: 11/762,873

(22) Filed: Jun. 14, 2007

(65) Prior Publication Data
US 2008/0310462 A1    Dec. 18, 2008

(51) Int. Cl.
*H01S 3/06* (2006.01)
(52) U.S. Cl. .......................... 372/67; 372/66
(58) Field of Classification Search .................. 372/67, 372/66
See application file for complete search history.

(56) References Cited

U.S. PATENT DOCUMENTS

| | | | |
|---|---|---|---|
| 5,343,490 A * | 8/1994 | McCall | 372/94 |
| 5,553,088 A | 9/1996 | Brauch et al. | |
| 6,259,711 B1 | 7/2001 | Laurell | |
| 6,661,568 B2 | 12/2003 | Hollemann et al. | |
| 2001/0005606 A1 | 6/2001 | Tanaka et al. | |
| 2003/0142705 A1 | 7/2003 | Hackel et al. | |
| 2005/0041718 A1 * | 2/2005 | Eisenbarth et al. | 372/94 |
| 2005/0079645 A1 | 4/2005 | Moriwaka | |

FOREIGN PATENT DOCUMENTS

| | | |
|---|---|---|
| DE | 100 04 999 | 9/2001 |
| EP | 1 063 049 | 12/2000 |
| WO | WO 01/22541 | 3/2001 |
| WO | WO 02/47219 | 6/2002 |

OTHER PUBLICATIONS

R.J. Shine Jr. et al "A 40 W cw, TEM00 mode, diode-laser-pumped, Nd: YAG zig-zag miniature-slab laser" SPIE Proceedings Series vol. 2379, The International Society for Optical Engineering SPIE, Feb. 5-7, 1995, San Jose, CA 99. 112-119.

Keming Du, Nianle Wu, Jiandong Xu, J. Giesekus, P. Loosen, R. Poprawe, "Partially end-pumped Nd: YAG slab laser with a hybrid resonator", Optics Letters 23, pp. 370-372 (1998).

Huegel H et al, "Solid State Thin Disc Laser", Bd. 3574, Aug. 31, 1998, p. 15-28.

Erhard S et al: "Novel pump design of Yb: YAG thin disc laser for operation at room temperature with improved efficiency" OSA Trend in Optics and Photonics Series (OSA Tops) vol. 26, Advanced Solid-State Lasers, Boston, MA, USA, Jan. 31-Feb. 3, 1999, pp. 38-44, XP000980115 1999 Washington, DC, USA, Opt. Soc. America, USA ISBN: 1-55752-583-8.

* cited by examiner

*Primary Examiner*—Dung T Nguyen
(74) *Attorney, Agent, or Firm*—Straub & Pokotylo; Michael P. Straub

(57) ABSTRACT

A laser system, which is used in material processing to produce a radiation line of small width and uniform high intensity in the longitudinal direction, produces radiation that has different mode numbers $M^2$ perpendicular to the propagation direction.

20 Claims, 4 Drawing Sheets

ANAMORPHOTIC SOLID-SATE LASER

Lasers have various uses in material processing, especially for bringing about surface changes.

A large number of industrial surface changes involving lasers require heating or melting of the surface. One example of such material processing is the crystallization of thin silicon layers for the manufacture of flat screens or solar cells to increase the electrical conductivity.

Another example of the processing of layers close to the surface is the crystallization of thin, doped layers close to the surface of a silicon wafer. Such doped layers are important for the function of transistors.

The aforementioned material processing methods are known in the prior art. In these methods both continuous (cw) and pulsed lasers can be used. The laser beam is moved across the surface. For this material processing the laser radiation is often shaped into a long and very narrow line. This line preferably has a uniform intensity distribution in the long dimension (an intensity distribution according to the so-called "top-hat" or box profile), while the intensity distribution in the short dimension, thus at right angles to the line, normally has a bell-shaped progression, for example a Gaussian profile. In the case of processes for material processing, thus the crystallization methods stated at the beginning in particular, the intensity (power density) or energy density of the laser radiation plays a decisive role. In continuous lasers this is the power per unit area, thus the power density. In pulsed lasers this is the energy per unit area, thus the energy density. Normally the highest possible intensities are required and for this reason it is desirable to keep the width of the line, thus the dimension perpendicular to the longitudinal extension of the line, as small as possible. A line width of 10 to 50 μm and even smaller widths are often required. For this purpose diffraction dimensions $M^2$ with a value of less than 5, ideally $M^2=1$, are especially suitable.

In the long dimension with box profile, the most homogeneous intensity distribution possible is what matters. We have found that this can best be achieved with the highest possible $M^2$ value due to the coherence attributes of the laser. Laser beams with an $M^2>7$, for example, in particular $M^2>15$, are highly suitable.

DE 100 04 999 A1 describes a diode laser with different mode numbers in different directions.

US 2005/079645 A1 and US 2001/0005606 A1 show applications of excimer lasers and the harmonic of a YAG laser in the crystallization of thin silicon layers. The subject matter is a specially designed beam homogenizer for producing a rectangular beam.

The object of the invention is to create a solid-state laser or a solid-state laser amplifier with good focusability in different axes and good beam homogenization.

Solid-state oscillators and solid-state laser amplifiers that achieve this object are described in the claims.

The laser beam produced by the laser according to the invention can be focused to an extremely narrow line and retains an extremely high intensity. This results from the following considerations:

To focus a laser beam, it is helpful if the laser oscillates at just a few spatial (transverse) modes. It is optimal if the laser only oscillates at a single mode ($TEM_{00}$ mode or also transverse fundamental mode). However, a laser that oscillates at several modes ("low order mode") facilitates said focusing, provided that there are only a few modes. The magnitude of the focus diameter is provided by the equation $$d = 4f\lambda M^2/\Pi D$$

in which the symbols have the following meaning:

d: attainable focus diameter measured at the points at which the intensity has fallen from maximum to $1/e^2$ (approx. 13.5%), f: focal length of the focusing lens, λ: wavelength of the laser, $M^2$: measurement of the number of modes. A fundamental mode laser has $M^2=1$, a multimode laser typically $M^2=2 \ldots 50$, or even substantially higher, Π: Pi 3.14 . . . , D: diameter of the beam incident on the focusing lens, measured at the dimension at which the intensity has fallen from maximum to $1/e^2$ The above equation shows that the number of spatial modes represented by the value $M^2$ has a substantial influence on the attainable focus diameter. For example, with a laser which emits at the wavelength 515 nm (for example a frequency-doubled Yb:YAG laser) and has a beam with a diameter D of 5 mm, a focus diameter of roughly 66 μm can be achieved if the laser has a mode number $M^2=10$ and the focusing lens has a focal length of 50 mm. Such a width is greater than the value of 10-50 μm normally required.

In theory the focus diameter could be reduced by reducing the focal length of the lens (f becomes smaller) or widening the beam ahead of the lens (D becomes greater). In practice, however, limits are set on this. Focal lengths smaller than 50 mm are not practicable, as then the focusing lens sits too close to the workpiece to be processed and could quickly become soiled by particles or vapours arising during laser processing. The beam diameter D cannot normally be increased substantially either, as otherwise the focusing lens exhibits strong spherical aberrations (thus focusing faults) or a very complex lens system with a high numerical aperture (thus large inlet apertures) has to be used, which increases the outlay on equipment. The depth of field is also reduced with a high numerical aperture, which causes additional technical problems.

However, if a mode number $M^2$ of only 3 to 5 is used with a laser, for example, then a focus magnitude of 20 to 33 μm could be attained in the above example.

Lasers with such an $M^2$ (called mode number below) are known in the prior art, although the output power is limited in such lasers, for example to around 20 W in a frequency-doubled Nd:YAG or Nd:YVO4 laser. However, running counter to the use of such a laser for the aforementioned applications is the requirement that the highest and most uniform intensity possible is present in the other dimension of the line, thus its long dimension. A laser beam often has a bell-shaped or Gaussian intensity distribution. There are also lasers which oscillate at many modes (multimode lasers) and which have an intensity distribution with a more or less flat maximum. But even this maximum is still too irregular with respect to the spatial intensity distribution for the aforementioned typical applications.

For this reason so-called beam homogenizers are used in the prior art to achieve a uniform intensity distribution of the laser beam. Beam homogenizers are normally based on the principle that the incident laser beam is divided into many partial beams (for example 3 to 20 partial beams) and these partial beams are superimposed spatially. The effect occurs here that the partial beams interfere with one another, i.e. they interact with one another in the manner that spatially different intensity increases and reductions arise. This interference leads to a very irregular intensity distribution, thus precisely not to the desired effect. The spatial intensity variations produced by interference are dependent on the coherence of the laser radiation and this is dependent in turn on the number of modes at which the laser oscillates. In general, it is the case that the more transverse mode orders that oscillate in the laser, thus the greater the $M^2$, the smaller the spatial coherence (and thus also the strength of the intensity variation).

A further measure for reducing disruptive interference is reducing the temporal coherence of the radiation. The laser should therefore oscillate in the widest possible spectral range. Yb:YAG or other Yb-doped crystals are particularly well suited to this purpose too on account of the broad amplification spectrum of several nm. The spectrum can be stabilized and changed by the choice of etalon. For example, by using a 50 µm thick quartz etalon an emission spectrum roughly 0.3 nm wide can be attained, which spectrum selects a predeterminable centre-of-gravity frequency depending on the angle of incidence at which the etalon is adjusted. This spectrum is advantageous for homogenization compared with the roughly 0.03-0.1 nm wide spectrum of a comparable Nd:YAG laser.

The problem solution according to the invention, thus the design of a laser that has different mode numbers $M^2$ in two orthogonal beam planes, facilitates a very largely homogeneous intensity distribution in the long dimension of the radiation line if a laser with the greatest possible $M^2$ is used for this, while to produce the smallest possible width of the radiation line at the same time the laser has the smallest possible $M^2$ in relation to this direction. The invention teaches therefore how a radiation line can be attained that is focused extremely strongly in a transverse direction and thus has a high intensity, while the radiation line in the direction of its longitudinal extension has the most homogeneous possible yet nonetheless high intensity distribution. This is achieved by setting different mode numbers respectively in or with the laser for said two directions, therefore by using an anamorphous laser. A beam homogenizer can be used in this regard, but does not have to be used.

The solid-state laser oscillator or solid-state laser amplifier according to the invention is distinguished in that, although the laser medium can be rotationally symmetrical (or even quadratic, rectangular or elliptical), a different $M^2$ is produced in x- and y-direction (i.e. perpendicular to the beam control in the resonator) by selection of a structural means (for example a cylinder mirror). The high $M^2$ leads on account of the coherence attributes associated with it to a considerably improved homogenization result, while the good focusability is retained in the axis that is "good" anyway. The present invention is thus distinguished by a rotationally symmetrical or almost rotationally symmetrical gain arrangement, such as in the case of a disk laser. A similar effect can be achieved even with an extremely asymmetrical gain geometry, for example in the case of a diode laser, slab laser or an excimer laser, but these have disadvantages in respect of wavelength, beam quality, compactness and beam and pulse stability.

According to a preferred configuration of the invention, the laser used has a mode number $M^2$ of 7 or greater in a first direction, while in a second, orthogonal direction it has a mode number $M^2$ of 7 or less or preferably 5 or less.

To attain the high intensities needed for the application, a Yb:YAG disk laser can be used, for example. Yb:YAG disk lasers are known for the high beam quality at high output power ratings. To produce radiation in the green spectral range, which is absorbed particularly well in silicon, a change in the frequency of the radiation emitted to the visible spectral range can be made by means of resonator-internal SHG (frequency doubling).

A laser of this kind, with which a line of the type described at the beginning with uniform intensity distribution in one direction and the smallest possible dimension in the other direction can be produced, can have an anamorphous active medium and/or an anamorphous resonator, for example. An anamorphous laser resonator has at least one anamorphous optical element. This can be for example a cylinder mirror, a cylinder lens, a prism, an aperture slot or an element producing astigmatism, such as an inclined plane-parallel plate. Other anamorphous components can also be used or several identical or different components for this purpose. The active laser medium itself can also have different spatial attributes in the two axes perpendicular to the radiation propagation direction. A factor common to the laser systems described here is that a laser beam is produced and used which in the one axis perpendicular to the direction of propagation of the beam has a small $M^2$, for example 7 or less, and in the other axis perpendicular to the propagation direction has a large $M^2$, for example 7 or greater.

An anamorphous laser-active medium would be a disk laser crystal, for example, which is pumped with a round or elliptical cross-section or is only doped in a round or elliptical area on the disk with laser-active ions.

The radiation of such a laser can be used very efficiently to carry out surface modifications. With conventional lasers, on the other hand, a large part of the radiation power must be destroyed (blanked out) to achieve the desired beam property. The invention thus facilitates a high efficiency of the luminous power produced with the laser.

Excimer lasers or $CO_2$ lasers are known which due to the geometry of their excitation profile typically emit an anamorphous beam, but the operation of excimer lasers is associated with handling toxic gases and its UV radiation leads to degradation and contamination problems. For this reason the present invention is preferably also used with lasers that emit more long-wave than in the UV range, for example in the visible range, in particular in the green range. $CO_2$ lasers emit at wavelengths of 10 µm and are therefore not suitable.

The solid-state lasers or amplifiers according to the invention have further advantages for the crystallization of thin layers in particular:

For the crystallization of thin layers, a pulse length (of the laser pulses) of 200 nanoseconds (ns) or longer is optimal. Excimer lasers, on the other hand, have typical pulse lengths of 40-80 ns. The use of pulse extenders for excimer lasers is expensive and results in radiation losses. The present invention therefore teaches in particular the use of solid-state lasers with pulse lengths of 200 ns or longer, in particular in the range from 200 to 700 ns. A variably adjustable length of the laser pulses is particularly advantageous in this regard. Depending on the end product of processing with the laser (thus of the crystallization in particular), pulse lengths between 200 and 700 ns can optionally be set depending on the processing method for a laser according to the invention which is provided with a computer control. For the crystallization of thin layers an optimal pulse length is around 300 ns. For the activation of depth dopings in semiconductors, optimal pulse lengths are typically in the range from 500-600 ns. Solid-state lasers can be designed such that their pulse length is programmable between 200 and 700 ns by computer. This embodiment of the present invention cannot be realized with excimer lasers. Diode lasers are continuously emitting lasers, which can only produce very small outputs in pulsed operation and are therefore less suitable for production processes for which pulsed radiation is necessary.

Furthermore, the present invention teaches as a preferred embodiment for the activation of deep dopings in semiconductors a penetration depth of the radiation of roughly 0.75 to 1.5 µm, preferably in the range of 0.85 to 1.2 µm. For example, the radiation of frequency-doubled lasers with wavelengths in the range from 515-532 nm is very suitable for this. The UV wavelengths of excimer lasers, on the other hand, penetrate only a few nm into e.g. silicon. Only a very small proportion of the infrared wavelength of high-power diode lasers is absorbed in thin silicon layers, the greater portion of the laser radiation penetrates the silicon layer and is lost. For the crystallization in question here of silicon layers in particular, the invention teaches generally the use of wavelengths in the visible range of the spectrum, especially in the green colour range.

For the crystallization of thin semiconductor layers, the present invention also includes pulse repetition frequencies of more than 10 kHz, preferably pulse repetition frequencies greater than 20 kHz, preferably greater than 30 kHz. With such pulse repetition frequencies crystals in a thin semiconductor layer can be drawn particularly well in the scanning direction, because with these high pulse repetition frequencies very many pulses of a small step width, typically 1 to 2 μm step width, can be set adjacent to one another. High-power excimer lasers have a pulse repetition frequency of just a few hundred Hz up to a maximum of 6 kHz and are therefore not very suitable for drawing crystals in the thin semiconductor layer.

Compared with excimer lasers, the use according to the invention of solid-state lasers also has the advantage of very good focusability of the laser radiation in the small dimension of the laser line, thus in the direction of the width of the line. If a mode number $M^2$ of 5 or less is used namely for the width of the line, this gives strong focusability of the laser radiation. When using excimer lasers this is only possible with an increased outlay and with a loss of power.

The prior art has known diode-pumped solid-state lasers in slab arrangement for some years, for example Keming Du, Nianle Wu, Jiandong Xu, J. Giesekus, P. Loosen, R. Poprawe, "Partially end-pumped Nd:YAG slab laser with a hybrid resonator", Optics Letters 23, pp. 370-372 (1998). Although slab laser arrangements according to the prior art are suitable for producing anamorphous laser radiation, they have qualified disadvantages in principle, namely the tendency to oscillation of parasitic oscillations due to the high amplification in the slab laser crystal and the tendency to beam direction instabilities. Furthermore, conventional slab lasers are timeconsuming in principle with respect to adjustment.

The invention therefore teaches the construction of disk lasers, which have different mode numbers $M^2$ in axes orthogonal to the direction of beam propagation. Disk lasers with an anamorphous resonator for producing radiation which has a mode number $M^2$ of 7 or greater in a first direction and a mode number $M^2$ of 7 or less in a second direction.

The invention also teaches a disk laser system with an amplifier for the resonator-external production of laser beams which have a mode number $M^2$ of 7 or greater in a first direction and a mode number $M^2$ of 7 or less in a second direction.

Embodiments of the invention are described in greater detail below with reference to the drawing.

Figure 2:
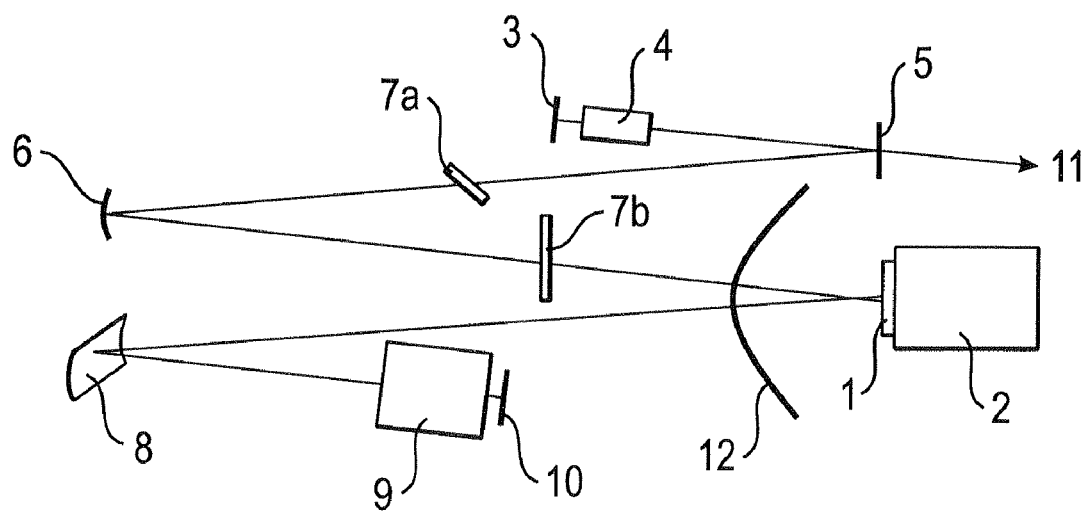
FIG. 2 shows a first embodiment of a laser system for producing a narrow radiation line.
Figure 3:
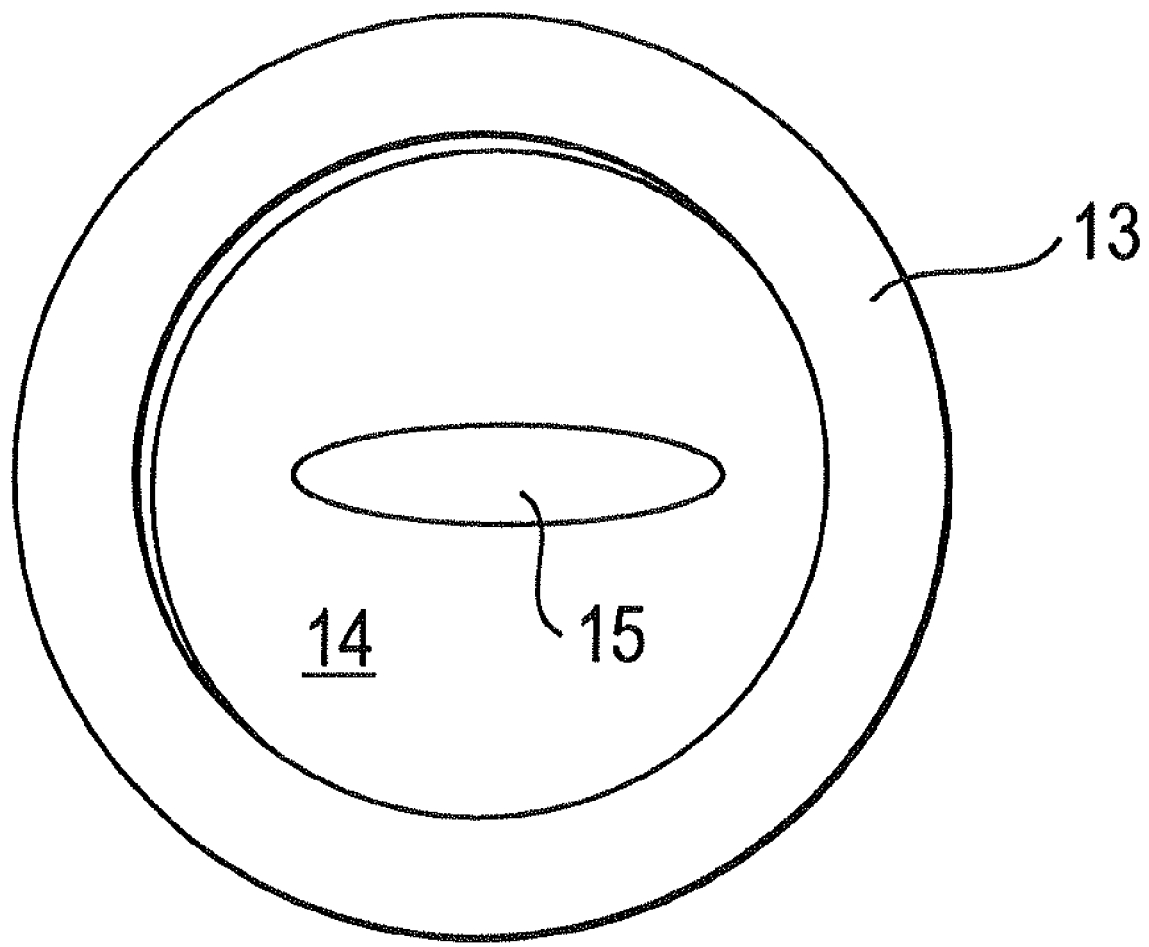
FIG. 3 shows a second embodiment of a laser system for producing a narrow radiation line.

In the embodiment according to FIGS. 2 and 3, the principle of the disk laser is applied. This is known for example from U.S. Pat. No. 5,553,088. A fundamental advantage of such disk laser arrangements consists in the fact that due to the design of the laser crystal as a thin disk, no problems arise with a thermal lens, and high outputs with a high beam quality and thus high intensities are thereby achieved.

The known laser resonators using this principle normally produce a symmetrical beam profile. Due to the high coherence of the radiation, such a laser has little suitability for beam homogenization.

In the arrangement according to FIG. 2, the disk laser is linked to an anamorphous resonator to produce anamorphous radiation. In detail:

According to FIG. 2, a laser crystal disk 1 is connected in a thermally conductive manner to a heat sink 2 of copper, for example, or copper-tungsten. A parabolic mirror 12 is used as so-called pumping optics for the laser. The laser resonator is defined by end mirrors 3 and 10. Arranged in the resonator is a Q-switch 9, for example an AOM or a Pockels cell. A Brewster plate 7a is used to polarize the infrared radiation in the resonator for the frequency conversion. An etalon 7b (for example 50-200 μm thick) is used to constrict and stabilize the longitudinal mode spectrum. The etalon is made of quartz glass, for example.

A cylinder mirror 8 is used to produce an anamorphous resonator and thus to produce laser radiation which has different mode numbers $M^2$ in different directions perpendicular to its direction of propagation. Another optical element, for example a cylinder lens or a prism, can be used equally well. The cylinder mirror 8 is arranged such that the radius of curvature lies in the horizontal plane.

In the plane of projection a smaller fundamental mode beam waist ($TEM_{00}$ beam waist) is formed thereby than in the plane perpendicular to this. Due to this, with a circular pump focus in the disk, a multimode beam waist with a higher mode order arises in the plane of projection than in the plane perpendicular to this.

With a pump focus of 4 mm, for example, and a $TEM_{00}$ beam waist with a diameter of 1.0 mm×1.58 mm a diffraction dimension $M^2$ of approximately 15×5 results.

In the arrangement described above, the disk laser is linked to an anamorphous resonator to produce the anamorphous radiation. This takes place due to said cylinder optics, thus for example a cylinder lens or a cylindrical mirror, a plane-parallel plate arranged at an angle of incidence not equal to zero, an oblique incidence of the radiation onto a spherically curved folding mirror or onto a prismatic element. In this case the second harmonic is produced resonator-internally, thus with high conversion efficiency, without needing the high power densities necessary in resonator-external doubling.

One advantage of the elliptical beam cross-section associated with the anamorphous resonator in the LBO crystal here is that the walk-off plane in the crystal can be placed into the large semiaxis of the elliptical beam profile in critical angle phase matching. This simultaneously produces high conversion efficiency at high outputs but power densities well below the destruction thresholds of the crystal.

An analogous arrangement can also be used for disk laser amplifiers.

The embodiment of a laser system according to FIG. 3 differs from the embodiment according to FIG. 2 in that the gain medium is anamorphous. In the disk 14, an elliptical pump cross-section 15 is selected and the disk is arranged in a symmetrical resonator or an anamorphous resonator in such a way that due to the particular choice of pump cross-section, an anamorphous beam arises in the disk. 13 designates a heat sink.

Such a resonator can be a resonator similar to FIG. 2, for example, but with a plane mirror or a spherical resonator instead of the cylinder mirror. The selection of radii of curvature and spacings of the mirrors is made accordingly such that the desired beam diameters are present in the optical elements.

In the case of an elliptical pump focus of 4 mm×2.2 mm, for instance, and a rotationally symmetrical $TEM_{00}$ beam diameter on the disk of 1.0 mm, the laser has a diffraction dimension of $M^2=15$ in the plane of the 4 mm axis of the pump ellipse and $M^2=5$ in the plane of the 2.2 mm axis of the ellipse.

A comparable effect can be achieved even with an aperture slot or with a disk that is doped only in one elliptical area.

Figure 4:
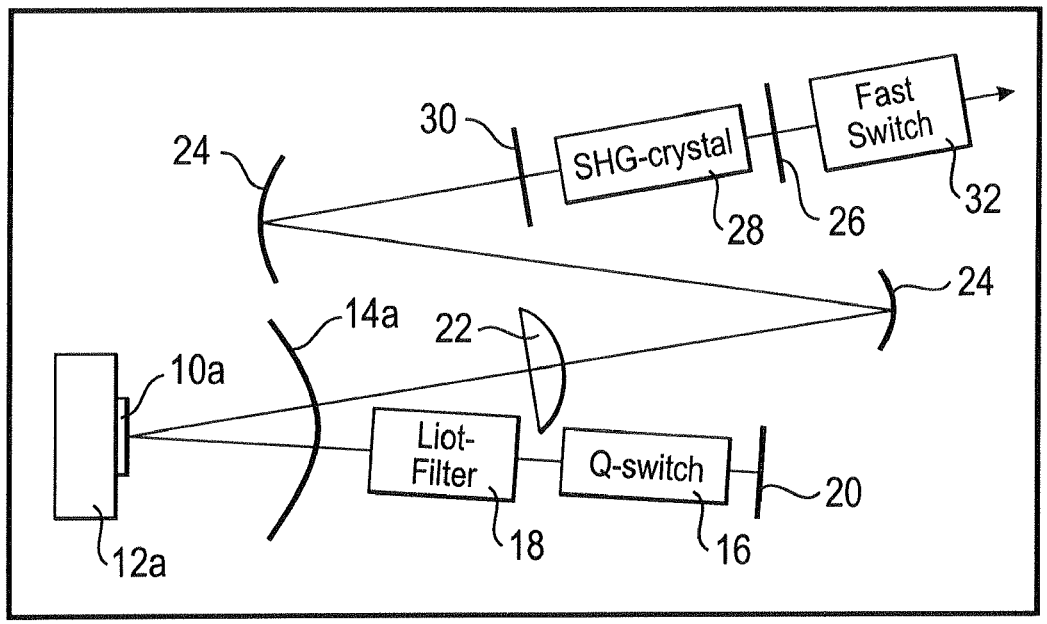
FIG. 4 shows a further embodiment of a laser system for producing a narrow radiation line.

In the embodiment according to FIG. 4, the principle of the disk laser is used. This is known for example from U.S. Pat. No. 5,553,088. A basic advantage of such disk laser arrangements lies in the fact that, due to the design of the laser crystal as a thin disk, no problems arise with a thermal lens.

The known laser resonators using this principle normally produce a symmetrical beam profile. Due to the high coherence of the radiation, such a laser has little suitability for beam homogenization.

In the arrangement according to FIG. 4, the disk laser is linked to an anamorphous resonator to produce anamorphous radiation. In detail:

According to FIG. 4, a laser crystal disk 10a is connected in a thermally conductive manner to a heat sink 12a of copper, for example, or copper-tungsten. A parabolic mirror 14a is used as so-called pump optics for the laser. The laser resonator is defined by an end mirror 20 and an output mirror 26. Arranged in the resonator is a Q-switch 16, for example an AOM or a Pockels cell. A Liot filter (birefringent filter) 18 is used to constrict the longitudinal mode spectrum. The Liot filter is made from crystalline quartz, for example.

An optical element 22 is used to produce an astigmatic resonator and thus to produce laser radiation which has different mode numbers $M^2$ in different directions perpendicular to its propagation direction. For example, the optical element 22 can be a cylinder lens. The element 22 is arranged such that a $TEM_{00}$ beam waist results in the x-plane, thus the plane of projection, also called tangential plane, and in the y-plane perpendicular to this (the so-called sagittal plane) a multimode beam waist results. Two curved mirrors 24 form a resonator-internal telescope.

The embodiment described above with the optical element 22 for producing an astigmatic resonator with said properties can be modified to the extent that instead of the optical element 22, one of the two mirrors 24 has a non-spherical form, in order to obtain the different mode numbers in the different directions.

The laser radiation output via the dichroic mirror 30 is frequency doubled in a frequency doubling crystal 28, e.g. LBO. The radiation is input via an output mirror 26 into an external fast switch 32 for green radiation, e.g. a Pockels cell or an AOM, and from there it is used for the applications described at the beginning.

In the arrangement described above, the disk laser is linked to an anamorphous resonator to produce the anamorphous radiation. This takes place through said cylinder optics, thus for example a cylinder lens or a cylindrical mirror, a parallel plate arranged at an angle, an oblique incidence of the radiation onto a spherically curved folding mirror or onto a prismatic element. In this case the second harmonic is produced resonator-internally, thus with high conversion efficiency.

One advantage of the elliptical beam cross-section in the resonator associated with the anamorphous resonator in this regard is that the power density in the non-linear doubler crystal is reduced while retaining the good beam quality in the direction of the critical phase matching angle. This simultaneously produces a high conversion efficiency at high outputs but power densities well below the destruction thresholds of the crystal.

Figure 5:
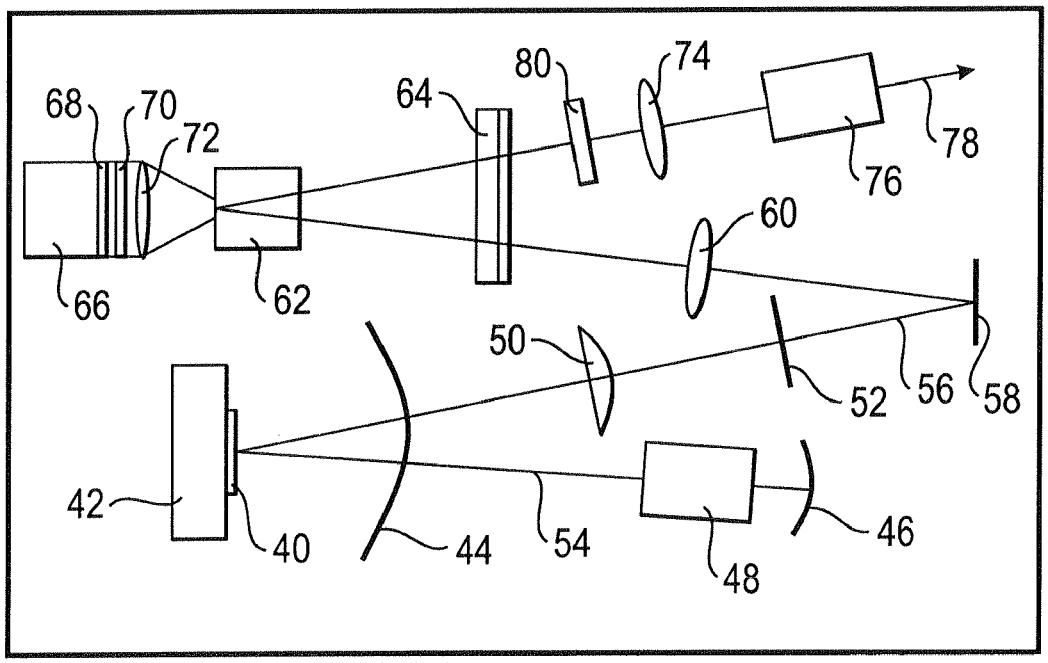
FIG. 5 shows a further embodiment of a laser system with a resonator-external amplifier for producing a narrow radiation line.

The embodiment of a laser system according to FIG. 5 differs from the embodiment according to FIG. 4 in particular to the extent that the anamorphous beam is post-amplified in an amplifier of matched geometry and is produced resonator-externally.

Figure 1:
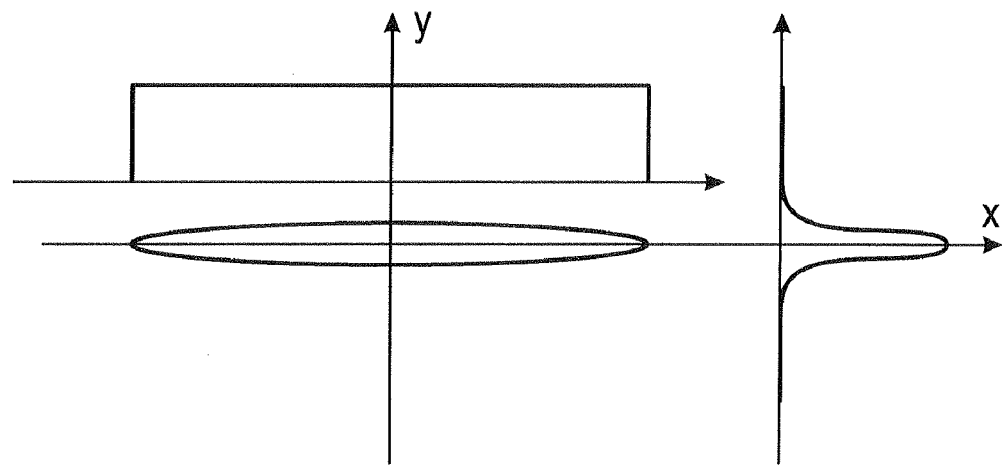
FIG. 1 shows a linear beam profile

A laser crystal disk 40, e.g. Nb:YVO4, with a diameter of 5 to 10 mm, a thickness of 0.2 to 0.3 mm, and doping of 0.5 to 1%, is mounted in a thermally conductive manner on a heat sink 42 and is pumped by a laser diode (not shown), for example a fibre-coupled laser diode. The pump spot diameter in the disk 40 is 1.6 mm=2 wp. A parabolic mirror 42 is used as pump optics. The resonator has an end mirror 46, which is curved concavely. As in the embodiment according to FIG. 1, a Q-switch 48, e.g. AOM or a Pockels cell, e.g. RTP or BBO, is arranged in the resonator.

An optical element 50 is used as in the embodiment according to FIG. 4 to produce an astigmatic resonator. The optical element can be a cylinder lens, for example. The element is arranged in such a way that a $TEM_{00}$ beam waist results with e.g. 2 wl (laser, disk)=2 wpump/15 in the x-plane (thus the plane of projection, also called tangential plane) and in the y-plane (perpendicular to this, sagittal plane) wl (laser, disk) =2 w (pump)/5. The laser thereby imitates with a diffraction dimension $Mx^2/My^2=15/5$.

An output mirror 52 defines the resonator with the end mirror 46. For example, the output mirror 52 can be flat with a reflectivity R=90%. The resonator radiation is identified therefore by the reference sign 54. The output IR beam 56 has a power for example of 20 W at 1064 nm, a repetition rate in the range of 50-100 kHz, a pulse duration of 20-300 ns, and is horizontally polarized with $M^2=5$ (sagittal plane)×15 (tangential plane). The beam which is output is sent via a deflection mirror 58 to a mode matching lens 60 for coupling the oscillator beam into one or more (e.g. 6) amplifier crystals 62, which are arranged serially in zigzag form (cf. U.S. Pat. No. 6,661,568), e.g. Nd:YVO4-micro-slab-crystal, e.g. 1 mm high, 4 m wide, 6 mm long, 0.5 to 1% doped, the beam being amplified to 60-150 W.

64 is a cylinder lens for mode matching the laser beam to the elliptical pump beam.

A diode laser line (array) 68 sits on a heat sink 66. Connected upstream of a so-called fast axis collimation is a focusing lens 72 for the pump radiation. The focusing lens 72 produces an elliptical pump focus in the amplifier crystal (see below), for example 2 mm×200 μm. A so-called λ-half-plate 80 for radiation with a wavelength of 1064 nm is used to set suitable polarization for the production of the second harmonic. Focusing optics 74 focus onto the optically non-linear crystal 76 arranged resonator-externally. The crystal 76 for the production of the second harmonic is of LBO, for example, and arranged for example with critical angle phase matching, especially in an elliptical beam profile, the crystal axes being arranged such that the poor beam quality does not lie in the plane of the critical phase matching angle. The crystal has dimensions of 3×5×25 $mm^3$, for example.

The frequency-doubled output beam 78 then lies in the green spectral range and has the following data, for example: 60 W, 300 ns, 100 kHz, $M^2=5\times15$.

The setting of the desired mode number values $M^2$ in the x- and the y-plane is realized here such that the laser beam diameter is selected smaller by a corresponding factor than the pump focus diameter. The desired mode orders of the laser are excited thereby. With a pump focus diameter of 5 mm and a desired $M^2$ of 5×15, the $TEM_{00}$ laser beam diameter at the location of the laser disk must be approximately 2.32 mm×1.3 mm.

Figure 6:
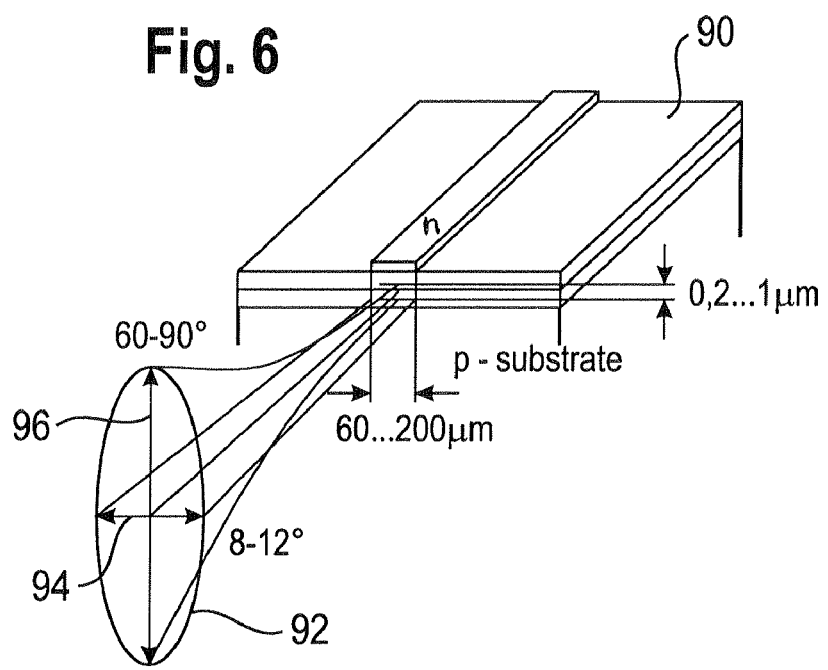
FIG. 6 shows a laser diode cell for producing laser radiation with different mode numbers in different directions.

FIG. 6 shows a laser diode line that is particularly suitable for producing radiation that has different mode numbers $M^2$ in different directions perpendicular to the radiation direction. Edge emitter laser diodes are known to emit an anamorphous laser beam. Such a beam source is particularly suitable for applications in which a continuous wave mode is required.

The laser diode line shown in FIG. 6 is shown with typical beam measurements and divergences with respect to the two axes 94, 96 of the emitted beam 92. Such diode lasers have in one axis (so-called fast axis, here vertical) radiation with a very small beam parameter product (beam dimension x divergence), but with reference to the other axis (so-called slow axis) emit radiation with a very large beam parameter product. The mode number and the beam parameter product are linked to one another here. If one parameter grows, so does the other, and vice-versa. In the embodiment shown, the radiation in the fast axis (vertical) has a beam parameter product of e.g. $0.2\ \mu m\times60°=0.21\ \mu m\times rad$ and in the slow axis (horizontal) of e.g. $60\ \mu m\times12°=12.6\ \mu m\times rad$.

In a laser of this kind, the requirement for different mode numbers $M^2$ in both axes perpendicular to the propagation direction of the laser beam is fulfilled satisfactorily.

Figure 7:
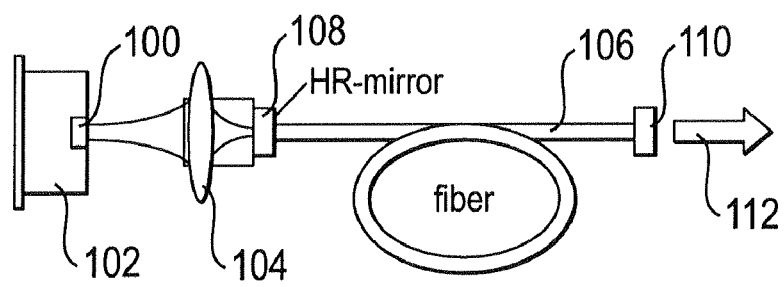
FIG. 7 shows a fibre laser.
Figure 7:
Figure 7:

FIG. 7 shows a further embodiment of a laser system for producing radiation which has different mode numbers $M^2$ in different directions perpendicular to the propagation direction. A so-called fibre laser is used for this purpose, the principles of which are basically known. Laser radiation is produced in a thin and long fibre, which is wound for example onto a coil. The material of the laser fibre is doped with foreign atoms and forms a laser-active optical element. A laser diode 100, which is arranged on a heat sink 102, is used for pumping. The radiation is coupled into an end mirror 108 of the fibre laser 106 via a lens 104. The radiation 112 with said attributes is output via an output mirror. Fibre lasers normally have a circular cross-section, as indicated in the figure by reference sign 106A. According to the present embodiment, however, the fibre 106 has an elliptical cross-section, as shown in FIG. 7 by the reference sign 106B. Instead of the elliptical cross-section an oval cross-section can also be chosen; the decisive factor is an asymmetry in two different directions perpendicular to the longitudinal direction of the fibre. Such a fibre will emit radiation like a single mode laser in one (narrow) dimension and radiation like a multimode laser in the other (larger) dimension. The stated requirement for small $M^2$ in one and large $M^2$ in the other axis perpendicular to the propagation direction of the laser radiation is thus satisfied.

The invention claimed is:

1. A Solid-state laser oscillator or solid-state laser amplifier with a disk-shaped amplifier medium, wherein the laser has a mode number $M^2$ of 7 or greater in a first direction and in a second direction which is orthogonal to the first direction has a mode number $M^2$ of 7 or less.

2. Solid-state laser oscillator or solid-state laser amplifier according to claim 1, wherein the laser oscillator or laser amplifier has at least one anamorphotic optical element.

3. Solid-state laser oscillator or solid-state laser amplifier according to claim 1, wherein the laser has an anamorphotic active laser medium.

4. Solid-state laser oscillator or solid-state laser amplifier according to claim 1 with an anamorphotic resonator for producing anamorphotic radiation.

5. Solid-state laser oscillator or solid-state laser amplifier according to claim 1 with cylinder optics.

6. Solid-state laser oscillator or solid-state laser amplifier according to claim 1 with a resonator-internally produced second harmonic.

7. Solid-state oscillator or solid-state laser amplifier according to claim 1 with elliptical laser beam cross-section in an NLO crystal.

8. Solid-state laser oscillator or solid-state laser amplifier according to claim 1 with resonator-external production of an anamorphotic beam in a laser amplifier.

9. Solid-state oscillator or solid-state laser amplifier according to claim 1 with an etalon, so that the spectral line width in >0.1 nm.

10. Solid-state laser oscillator or solid-state laser amplifier according to claim 1 with pulse lengths in the range from 200 to 700 nanoseconds (ns).

11. Solid-state laser oscillator or solid-state laser amplifier according to claim 10 with a computer for setting the pulse length in the range from 200 to 700 ns.

12. Solid-state laser oscillator or solid-state laser amplifier according to claim 1 with wavelengths in the range from 500 to 550 nm.

13. Solid-state laser oscillator or solid-state laser amplifier according to claim 1 with pulse repetition frequencies of 10 kHz or more.

14. Use of a solid-state laser oscillator or solid state laser amplifier according to claim 13 for crystallizing thin layers.

15. Disk laser with an anamorphous resonator for producing radiation which has a mode number $M^2$ of 7 or greater in a first direction and in a second direction has a mode number $M^2$ of 7 or less.

16. Disk laser system with an amplifier for resonator-external production of laser beams which have a mode number $M^2$ of 7 or greater in a first direction and in a second direction have a mode number $M^2$ of 7 or less.

17. Solid-state laser oscillator or solid-state laser amplifier according to claim 1 with radiation with wavelengths in the visible range of the electromagnetic spectrum.

18. The Solid-state laser oscillator or solid-state laser amplifier of claim 1, wherein said disk-shaped amplifier medium is a crystal disk has a diameter in the range of 5 mm to 10 mm.

19. The Solid-state laser oscillator or solid-state laser amplifier of claim 1, wherein said disk-shaped laser amplifier medium has a thickness in the range of 0.2 mm to 0.3 mm.

20. The Solid-state laser oscillator or solid-state laser amplifier of claim 18, wherein said disk-shaped amplifier medium.

* * * * *